(12) United States Patent
Song

(10) Patent No.: US 12,347,007 B2
(45) Date of Patent: Jul. 1, 2025

(54) APPARATUS FOR EDITING PRINTING AREA AND METHOD THEREFOR TO AVOID IMAGE CUT-OFF AND WHITE BLANK

(71) Applicant: DIGITAL PHOTO CORPORATION, Seoul (KR)

(72) Inventor: Woo Jin Song, Seoul (KR)

(73) Assignee: DIGITAL PHOTO CORPORATION, Seoul (KR)

( * ) Notice: Subject to any disclaimer, the term of this patent is extended or adjusted under 35 U.S.C. 154(b) by 0 days.

(21) Appl. No.: 18/270,475

(22) PCT Filed: Oct. 26, 2021

(86) PCT No.: PCT/KR2021/015127
§ 371 (c)(1),
(2) Date: Jun. 29, 2023

(87) PCT Pub. No.: WO2022/145667
PCT Pub. Date: Jul. 7, 2022

(65) Prior Publication Data
US 2024/0054706 A1     Feb. 15, 2024

(30) Foreign Application Priority Data
Jan. 4, 2021 (KR) .................. 10-2021-0000571

(51) Int. Cl.
*G06F 3/00* (2006.01)
*G06F 3/04845* (2022.01)
(Continued)

(52) U.S. Cl.
CPC .......... *G06T 11/60* (2013.01); *G06F 3/04845* (2013.01); *G06F 3/0488* (2013.01);
(Continued)

(58) Field of Classification Search
None
See application file for complete search history.

(56) References Cited

U.S. PATENT DOCUMENTS

| 2002/0051205 A1* | 5/2002 | Teranishi | H04N 1/3875 358/1.18 |
| 2003/0174346 A1* | 9/2003 | Nagatani | H04N 1/3877 358/1.9 |
| 2011/0058193 A1* | 3/2011 | Shiraishi | H04N 1/32128 358/1.9 |

(Continued)

FOREIGN PATENT DOCUMENTS

| JP | H06143730 | 5/1994 |
| JP | H06143730 A * | 5/1994 |

(Continued)

OTHER PUBLICATIONS

"Notice of Reasons for Refusal of Japan Counterpart Application", issued on Jun. 18, 2024, with English translation thereof, p. 1-p. 10.

(Continued)

*Primary Examiner* — Akwasi M Sarpong
*Assistant Examiner* — Pawan Dhingra
(74) *Attorney, Agent, or Firm* — JCIPRNET

(57) ABSTRACT

Disclosed are a print region editing device and a method thereof. When an image is released during enlargement, reduction, or movement within a preset guideline portion, a print region rectangle or print region square of a longer-side length and a shorter-side length is configured according to a long-short ratio of the guide line portion and a long-short ratio of the corresponding image, and the corresponding image is enlarged or maintained so that four vertices of the corresponding image match four vertices of the configured print region rectangle or print region square, thereby freely changing a paper-full format and an image-full format depending on the enlargement or reduction of the image.

2 Claims, 16 Drawing Sheets

(51) Int. Cl.
*G06F 3/0488* (2022.01)
*G06F 3/12* (2006.01)
*G06T 3/40* (2006.01)
*G06T 11/60* (2006.01)

(52) U.S. Cl.
CPC .......... *G06F 3/1208* (2013.01); *G06F 3/1253* (2013.01); *G06F 3/1256* (2013.01); *G06F 3/1272* (2013.01); *G06T 3/40* (2013.01)

(56) References Cited

U.S. PATENT DOCUMENTS

| | | | | |
|---|---|---|---|---|
| 2011/0157225 | A1* | 6/2011 | Cheon | G06F 3/04842 345/636 |
| 2014/0160166 | A1* | 6/2014 | Cheon | G06T 11/60 345/636 |
| 2014/0300641 | A1* | 10/2014 | Chae | G09G 5/00 345/659 |
| 2016/0334986 | A1* | 11/2016 | Cheon | G06F 3/04842 |

FOREIGN PATENT DOCUMENTS

| | | | | |
|---|---|---|---|---|
| JP | 2003274155 | | 9/2003 | |
| JP | 2012015887 | | 1/2012 | |
| JP | 2012015887 A | * | 1/2012 | ......... H04N 1/00411 |
| JP | 20160142051 A | * | 12/2012 | |
| KR | 1020020085327 | | 11/2002 | |
| KR | 1020060111814 | | 10/2006 | |
| KR | 1020070000652 | | 1/2007 | |
| KR | 1020070019484 | | 2/2007 | |
| KR | 1020080077035 | | 8/2008 | |
| KR | 20110074166 | | 6/2011 | |
| KR | 20160142051 A | * | 12/2012 | |
| KR | 20160142051 | | 12/2016 | |
| WO | WO-2008072907 A1 | * | 6/2008 | ........... G06F 3/1208 |
| WO | WO-2022145667 A1 | * | 7/2022 | ......... G06F 3/04845 |

OTHER PUBLICATIONS

"Office Action of Korea Counterpart Application", issued on Feb. 22, 2023, with English translation thereof, p. 1-p. 16.
"Office Action of Korea Counterpart Application", issued on Aug. 19, 2022, with English translation thereof, p. 1-p. 12.
"Office Action of Korea Counterpart Application", issued on Feb. 2, 2023, with English translation thereof, p. 1-p. 16.
"Office Action of Korea Counterpart Application", issued on Aug. 1, 2023, with English translation thereof, p. 1-p. 10.

* cited by examiner

APPARATUS FOR EDITING PRINTING AREA AND METHOD THEREFOR TO AVOID IMAGE CUT-OFF AND WHITE BLANK

TECHNICAL FIELD

The present disclosure relates to a print region editing device and a method thereof, and more particularly, to a print region editing device and a method thereof capable of, when an image is released during enlargement, reduction, or movement within a preset guideline portion, configuring a print region rectangle or print region square of a longer-side length and a shorter-side length according to a long-short ratio of the guide line portion and a long-short ratio of the corresponding image and enlarging or maintaining the corresponding image so that four vertices of the corresponding image match four vertices of the configured print region rectangle or print region square.

BACKGROUND ART

Smartphones are intelligent terminals in which various computer support functions are added to mobile phones, and are terminals in which a user may install desired applications.

In addition, the ratio of an image captured through a smartphone, etc. does not match the ratio of print paper having a preset size, and thus, when the corresponding image is to be printed, the image is printed on print paper through a print paper-full option in which print paper is full of the image and the original image is partially cut off and an image pull option in which the original image is entirely printed and a white blank is formed according to the ratio in a print option.

In the case of the print paper-full and image-full, a user has to endure inconvenience as the original image is cut partially off or a white blank is formed in a portion of the print paper.

DISCLOSURE

Technical Problem

An object of the present disclosure is to provide a print region editing device and a method thereof capable of, when an image is released during enlargement, reduction, or movement within a preset guideline portion, configuring a print region rectangle or print region square of a longer-side length and a shorter-side length according to a long-short ratio of the guide line portion and a long-short ratio of the corresponding image and enlarging or maintaining the corresponding image so that four vertices of the corresponding image match four vertices of the configured print region rectangle or print region square.

Technical Solution

A print region editing device according to an embodiment of the present disclosure includes: a display unit configured to display a print region editing screen including an image; and a controller configured to, when the image is released in a guideline portion of the print region editing screen in a state in which any one function among enlargement, reduction, and movement is performed by a user's touch gesture on the image, calculate each of a first ratio obtained by dividing a longer-side length of the guideline portion by a shorter-side length of the guideline portion and a second ratio obtained by dividing a longer-side length of the image by a shorter-side length of the image, determine whether the calculated first ratio is greater than or equal to the calculated second ratio, calculate, when the calculated first ratio is greater than or equal to the calculated second ratio as a result of the determination, each of a longer-side length and a shorter-side length of a print region based on the longer-side length and the shorter-side length of the guideline portion and the longer-side length and shorter-side length of the image to generate the print region, match a center point of the generated print region to a center point of the guideline portion, enlarge or maintain the image so that four vertices of the image match four vertices of the generated print region, and display a resultant image on the display unit.

The controller may be configured to calculate a fifth ratio between the shorter-side length of the guideline portion and the shorter-side length of the image, calculate the shorter-side length of the print region by multiplying the shorter-side length of the image by the calculated fifth ratio, calculate the longer-side length of the print region by multiplying the longer-side length of the image by the calculated fifth ratio, and generate the print region having a rectangular or square shape including the calculated shorter-side length of the print region and the calculated longer-side length of the print region.

When the calculated first ratio is smaller than the calculated second ratio as a result of the determination, the controller may be configured to calculate each of a different longer-side length and a different shorter-side length of a different print region based on the longer-side length and the shorter-side length of the guideline portion and the longer-side length and the shorter-side length of the image to generate the different print region, match a center point of the generated different print region to a center point of the guideline portion, and enlarge or maintain the image so that four vertices of the image match four vertices of the generated different print region, and display a resultant image on the display unit.

A print region editing method according to an embodiment of the present disclosure includes: when an image displayed on a display unit is released in a guideline portion of the print region editing screen in a state in which any one function among enlargement, reduction, and movement is performed by a user's touch gesture on the image, calculating, by a controller, each of a third ratio obtained by dividing a shorter-side length of the guideline portion by a longer-side length of the guideline portion and a fourth ratio obtained by dividing a shorter-side length of the image by a longer-side length of the image; determining, by the controller, whether the calculated third ratio is smaller than or equal to the calculated fourth ratio; calculating, by the controller, when the calculated third ratio is smaller than or equal to the calculated fourth ratio as a result of the determination, each of a longer-side length and a shorter-side length of a print region based on the longer-side length and the shorter-side length of the guideline portion and the longer-side length and shorter-side length of the image to generate the print region; matching, by the controller, a center point of the generated print region to a center point of the guideline portion; and enlarging or maintaining, by the controller, the image so that four vertices of the image match four vertices of the generated print region and displaying a resultant image on the display unit.

The generating of the print region may include: calculating a fifth ratio between the shorter-side length of the guideline portion and the shorter-side length of the image; calculating the shorter-side length of the print region by multiplying the shorter-side length of the image by the calculated fifth ratio; calculating the longer-side length of the print region by multiplying the longer-side length of the image by the calculated fifth ratio; and generating the print region having a rectangular or square shape including the calculated shorter-side length of the print region and the calculated longer-side length of the print region.

The enlarging or maintaining of the image so that four vertices of the image match four vertices of the generated print region and displaying a resultant image on the display unit may include one of displaying the image on the display unit, while maintaining the image as it is, when a size of the image and a size of the generated print region are the same; and enlarging a ratio between a longer side and a shorter side of the image to fit a ratio between a longer side and a shorter side of the generated print region and displaying the enlarged image in the print region, when the size of the image is smaller than the size of the generated print region.

The print region editing method may further include: when the calculated third ratio is greater than the calculated fourth ratio as a result of the determination, calculating, by the controller, each of a different longer-side length and a different shorter-side length of a different print region based on the longer-side length and the shorter-side length of the guideline portion and the longer-side length and the shorter-side length of the image to generate the different print region; matching, by the controller, a center point of the generated different print region to a center point of the guideline portion; and enlarging or maintaining, by the controller, the image so that four vertices of the image match four vertices of the generated different print region and displaying a resultant image on the display unit.

The generating of the different print region may include: calculating a sixth ratio between the longer-side length of the guideline portion and the longer-side length of the image; calculating the different shorter-side length of the different print region by multiplying the shorter-side length of the image by the calculated sixth ratio; calculating the different longer-side length of the different print region by multiplying the longer-side length of the image by the calculated sixth ratio; and generating the different print region having a rectangular or square shape including the calculated different shorter-side length of the different print region and the calculated different longer-side length of the different print region.

The enlarging or maintaining of the image so that four vertices of the image match four vertices of the generated different print region and displaying a resultant image on the display unit may include any one of displaying the image on the display unit, while maintaining the image as it is, when a size of the image and a size of the generated different print region are the same; and enlarging a ratio between a longer side and a shorter side of the image to fit a ratio between a longer side and a shorter side of the generated different print region and displaying the enlarged image in the different print region, when the size of the image is smaller than the size of the generated different print region.

The print region editing method may further include: when a storage item is selected in the print region editing screen displayed on the display unit, storing, by the controller, a final image which is an image enlarged or maintained compared to an original image according to the generated print region or a different print region together with a size of print paper on which the corresponding final image according to a user input in an option item is to be printed, print border setting information, a print paper type, and the automatic correction information; performing, by the controller, a payment function for a cost according to a quantity to be printed in order to print the final image on print paper, by interworking with a server and a payment server; and printing, by the controller, the final image on print paper by interworking with the server and the printer, after the payment function is normally performed.

Advantageous Effects

In the present disclosure, when an image is released during enlargement, reduction, or movement within a preset guideline portion, a print region rectangle or print region square of a longer-side length and a shorter-side length is configured according to a long-short ratio of the guide line portion and a long-short ratio of the corresponding image, and the corresponding image is enlarged or maintained so that four vertices of the corresponding image match four vertices of the configured print region rectangle or print region square, thereby freely changing a paper-full format and an image-full format depending on the enlargement or reduction of the image.

MODE FOR DISCLOSURE

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that may be properly understood by the skilled person in the art. In addition, general terms used in the description of the present disclosure should be construed according to definitions in dictionaries or according to its front or rear context, and should not be construed to have an excessively restrained meaning.

The singular expression used in the present specification includes the plural expression unless the context clearly indicates otherwise. In the specification, it is to be noted that the terms "comprising", "including", and the like are not be construed as necessarily including several components or several steps described in the specification and some of the above components or steps may not be included or additional components or steps are construed as being further included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present disclosure will be described below in detail with reference to the accompanying drawings where those components are rendered the same reference number that are the same or are in correspondence, regardless of the figure number, and redundant explanations are omitted.

In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings.

Figure 1:
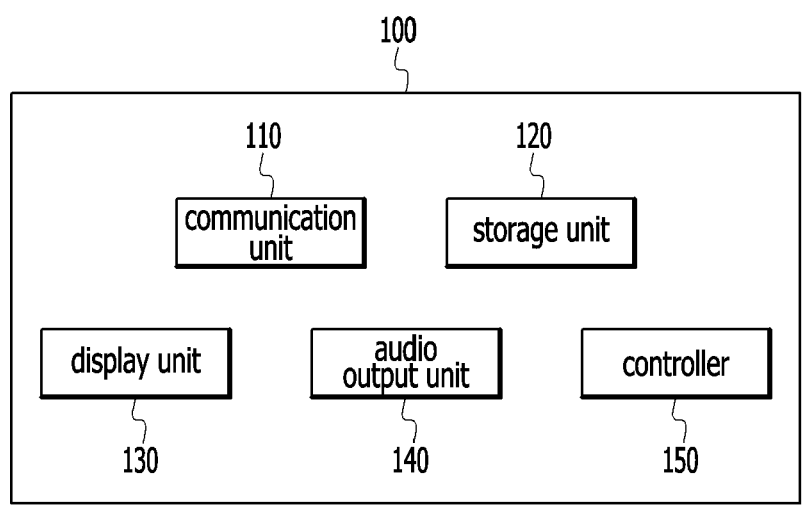
FIG. 1 is a block diagram illustrating a configuration of a print region editing device according to an embodiment of the present disclosure.

FIG. 1 is a block diagram illustrating a configuration of a print region editing device 100 according to an embodiment of the present disclosure.

As shown in FIG. 1, the print region editing device 100 includes a communication unit 110, a storage unit 120, a display unit 130, an audio output unit 140 and a controller 150. Not all components of the print region editing device 100 shown in FIG. 1 are essential components, and the print region editing device 100 may be implemented with more components than those shown in FIG. 1 or may be implemented with fewer components than those shown in FIG. 1.

The print region editing device 100 may be applied to various terminals, such as a haptic device, a smartphone, a portable terminal, a mobile terminal, a foldable terminal, and a personal digital assistant (PDA), a portable multimedia player (PMP), a telematics terminal, a navigation terminal, a personal computer, a notebook PC, a slate PC, a tablet PC, ultrabook, a wearable device (including, for example, a smartwatch, a smart glass, a head mounted display (HMD), etc.), a Wibro terminal, an Internet protocol television (IPTV) terminal, a smart TV, a digital broadcasting terminal, an audio video navigation (AVN) terminal, an audio/video (A/V) system, a flexible terminal, a digital signage device, etc. In this case, the print region editing device 100 may be a terminal possessed by a user who wants to print an image held by the user on print paper.

Also, the print region editing device 100 communicates with a server (not shown), a payment server (not shown), and the like.

Here, the server may be implemented in the form of a web server, a database server, a proxy server, and the like. In addition, one or more of a network load distribution mechanism and various software enabling the corresponding server to operate on the Internet or other networks may be installed in the server, thereby implementing a computerized system. Also, the network may be an http network, a private line, an intranet, or any other network. Furthermore, the print region editing device 100 and the server may be connected through a secure network to prevent data from being attacked by any hacker or other third party. In addition, the server may include a plurality of database servers, and these database servers may be implemented to be separately connected to the server through any type of network connection including a distributed database server architecture.

The communication unit 110 is communicatively connected to any internal component or at least one external terminal through a wired/wireless communication network. At this time, the external terminal may include a server (not shown), a printer (not shown), another terminal (not shown), and the like. Here, wireless Internet technologies include wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), etc., and the communication unit 110 transmits and receives data according to at least one wireless Internet technology within a range including Internet technologies not listed above. In addition, short-range communication technologies may include Bluetooth, radio frequency identification (RFID), infrared data association (IrDA), ultra wideband (UWB), ZigBee, and near field communication (NFC), ultra sound communication (USC), visible light communication (VLC), Wi-Fi, Wi-Fi Direct, and the like. In addition, wired communication technologies may include power line communication (PLC), universal serial bus (USB) communication, Ethernet, serial communication, optical/coaxial cables, and the like.

In addition, the communication unit 110 may mutually transmit information with a certain terminal through a USB.

In addition, the communication unit 110 transmits and receives wireless signals to and from a base station, the server, the printer, and other terminals on a mobile communication network established according to technical standards or communication methods for mobile communication (e.g., Global System for Mobile communication (GSM), Code Division Multi Access (CDMA), Code Division Multi Access 2000 (CDMA2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.

In addition, the communication unit 110 transmits a final image, print paper size, print border setting information (e.g., with white space, without white space, etc.), print paper type (e.g., glossy, matte, etc.), automatic correction information (e.g., brightness correction, no correction, etc.) to the server, the printer, and other terminals, under the control of the controller 150.

The storage unit 120 stores various user interfaces (UI), graphic user interfaces (GUI), and the like.

In addition, the storage unit 120 stores data and programs necessary for the print region editing device 100 to operate.

That is, the storage unit 120 may store a plurality of application programs (applications) running in the print region editing device 100, data for operating the print region editing device 100, and commands. At least some of these application programs may be downloaded from an external server through wireless communication. In addition, at least some of these application programs may exist on the print region editing device 100 from the time of release for basic functions of the print region editing device 100. Meanwhile, the application programs may be stored in the storage unit 120, installed in the print region editing device 100, and run by the controller 150 to perform the operation (or function) of the print region editing device 100.

In addition, the storage unit 120 may include at least one of storage mediums, among a flash memory type, a hard disk type, a multimedia card micro type, a card type memory (e.g., SD or XD), a magnetic memory, a magnetic disk, an optical disk, random access memory (RAM), static random access memory (SRAM), read-only memory (ROM), electrically erasable programmable read-only memory (EEPROM), and programmable read-only memory (PROM). Also, the print region editing device 100 may operate a web storage that performs the storage function of the storage unit 120 on the Internet, or may operate in relation to the web storage.

In addition, the storage unit 120 stores the final image having an image size maintained or adjusted compared to the original image under the control by a user, the print paper size, the print border setting information (e.g., with white space, without white space, etc.), the print paper type (e.g., glossy, matte, etc.), the automatic correction information (e.g., brightness correction, no correction, etc.) under the control of the controller 150.

The display unit 130 may display various contents, such as various menu screens, using a user interface and/or a graphic user interface stored in the storage unit 120 under the control of the controller 150. Here, content displayed on the display unit 130 includes various text or image data (including various information data) and menu screens including data such as icons, list menus, and combo boxes. Also, the display unit 130 may be a touch screen.

In addition, the display unit 130 may include at least one of a liquid crystal display (LCD), a thin film transistor-liquid crystal display (TFT LCD), an organic light-emitting diode (OLED), a flexible display, a three-dimensional display (3D Display), an e-ink display, a light emitting diode (LED).

Also, the display unit 130 displays an application execution result screen according to execution of a dedicated application under the control of the controller 150.

The audio output unit 140 outputs audio information included in a signal that has been subjected to predetermined signal processing by the controller 150. Here, the audio output unit 140 may include a receiver, a speaker, a buzzer, and the like.

In addition, the voice output unit 140 outputs a guide voice generated by the controller 150.

In addition, the audio output unit 140 outputs audio information (or sound information) corresponding to an application execution result screen displayed on the display unit 130 under the control of the controller 150.

The controller or microcontroller unit (MCU) 150 executes overall control functions of the print region editing device 100.

In addition, the controller 150 executes overall control functions of the print region editing device 100 using programs and data stored in the storage unit 120. The controller 150 may include RAM, ROM, CPU, GPU, and a bus, and the RAM, ROM, CPU, and GPU may be connected to each other through the bus. The CPU may access the storage unit 120 and perform booting using the 0/S stored in the storage unit 120, and may perform various operations using various programs, content, data, etc. stored in the storage unit 120.

In addition, the controller 150 subscribes the user as a member for receiving an image editing function, a print request function, etc. through a dedicated application and/or website provided by the server by interworking with the server, and registers personal information or the like to the server. At this time, the personal information includes an ID, an e-mail address, a password, a name, a gender, a date of birth, contact information (or phone number), an address, and the like.

In addition, the controller 150 may subscribe the user as a member to the server by using SNS account information or mobile messenger account information to which the user of the print region editing device 100 has joined. Here, the SNS account may be information related to Facebook, Twitter, Kakao Story, Naver, PAYCO, and the like. In addition, the mobile messenger account may be information related to KakaoTalk, line, viber, wechat, whatsapplication, telegram, snapchat, etc.

In addition, when performing the member sign-up procedure, the controller 150 may need to complete an authentication function through a user authentication means (e.g., including a mobile phone, credit card, i-PIN, etc.) to normally complete the member sign-up procedure for the server.

In addition, after membership registration is completed, the controller 150 downloads a dedicated application (or application/application program/specific application) provided from the server in order to use the service provided by the server to be installed. In this case, the dedicated application may be an application for performing an image editing function, a print request function, and the like.

Also, the controller 150 executes a dedicated application pre-installed in the corresponding print region editing device 100 and displays an application execution result screen according to the execution of the dedicated application on the display unit 130. At this time, the application execution result screen includes an image editing menu (or item/button) for scaling down or scaling up an image selected by the user by multi-touch and then adjusting a size of the reduced/enlarged image according to print paper, a print request menu for requesting a print for an edited image, a setting menu for setting dedicated application functions, and the like. Here, the controller 150 has signed up as a member to a server (not shown) providing the corresponding dedicated application and may perform a log-in procedure using the ID or the password according to the member registration and a barcode or a QR code including the ID to execute the dedicated application to perform one or more functions (e.g., image editing function, print request function, etc.) of the corresponding dedicated application.

In addition, when a preset image editing menu is selected from the application execution result screen displayed on the display unit 130, the controller 150 scales down or scales up the image selected by the user corresponding to the selected image editing menu by multi-touch, and then displays a print region editing screen for adjusting the size of the reduced/enlarged image according to print paper on the display unit 130. Here, the print region editing screen (or image editing screen) includes a load item for loading an image being stored, an option item for selecting/setting various information (e.g., a print paper size, print border setting information, a print paper type, automatic correction information, etc.) related to printing, a storage item for storing edited images according to a print region, a guideline portion display region (or guideline portion display item) for displaying a fixed guideline portion that cannot be moved or resized, a print region display item (or print region0 for displaying a print region (or other print region) generated according to enlargement/reduction/movement of an image. At this time, the print region display item maintains an inactive state, and when a print region (or other print region) is generated according to enlargement/reduction/movement of an image, the print region display item may be activated to display the generated print region (or other print region). In addition, in the guideline portion displayed in the guideline portion display region, a print paper size (e.g., 5×7 inches, resolution of 1024×768 pixels) may be set in advance according to design of a designer, and the corresponding guideline display region may be selected (or touched) or the guideline portion (or the print paper size) set as a default maybe changed through the setting menu.

In addition, when the load item is selected in the print region editing screen displayed on the display unit 130, the controller 150 displays one or more images previously stored in the storage unit 120.

In addition, when one image is selected among one or more images displayed on the display unit 130 according to user selection (or user input/touch/control), the controller 150 displays the selected image in an image display region of the print region editing screen. Here, when the image display region is omitted in the print region editing screen, the controller 150 may display the corresponding image in a state in which one vertex of the guideline portion display region (or the guideline portion) and a vertex of the selected image corresponding to the corresponding vertex match.

In addition, in a state in which an enlargement function, a reduction function, or a movement function is performed on an image displayed on the display unit 130 by a user's touch gesture or in a state in which the enlargement function, reduction function, or movement function in an editing tool (not shown) in the print region editing screen is performed on the corresponding image, when the corresponding image is released from the guideline portion (or the guideline portion display region) in the print region editing screen (or when the corresponding image is released in a state in which four vertices of the corresponding image are included in the four vertices of the guideline portion/or in a state in which the corresponding image is included in the guideline portion), the controller 150 may separately calculate a first ratio (e.g., defined as a variable p) obtained by dividing a longer-side length (or a vertical length) of the guideline portion by a shorter-side length (or a horizontal length) of the guideline portion and a second ratio (e.g., defined as a variable r) obtained by dividing a longer-side length of the image by a shorter-side length of the image. Here, the image may be in a state in which a size of the original image is maintained as it is, a state enlarged compared to the original image, a state reduced compared to the original image, and the like, according to user control. In this case, the longer-side length and the shorter-side length of the guideline portion and the image may be the number of pixels. Also, the user's touch gesture includes drag and drop, panning, pinch, and the like.

In this case, in a state in which an enlargement function, a reduction function, or a movement function is performed on an image displayed on the display unit 130 by a user's touch gesture or in a state in which the enlargement function, reduction function, or movement function in an editing tool (not shown) in the print region editing screen is performed on the corresponding image, when the corresponding image is released from the guideline portion (or the guideline portion display region) in the print region editing screen (or when the corresponding image is released in a state in which four vertices of the corresponding image are included in the four vertices of the guideline portion/or in a state in which the corresponding image is included in the guideline portion), the controller 150 may separately calculate a third first ratio (e.g., defined as a variable p') obtained by dividing the shorter-side length of the guideline portion by a longer-side length of the guideline portion and a fourth ratio (e.g., defined as a variable r') obtained by dividing the shorter-side length of the image by the longer-side length of the image.

In this manner, the controller 150 may calculate the ratio between the longer-side length and the shorter-side length of the guideline portion and the ratio between the longer-side length and the shorter-side length of the image, separately.

In addition, the controller 150 determines (or checks) whether the calculated first ratio p is greater than or equal to the calculated second ratio r. At this time, the controller 150 may determine whether the calculated third ratio p' is smaller than or equal to the calculated fourth ratio r'.

As a result of the determination (or the result of the checking), when the calculated first ratio p is greater than or equal to the calculated second ratio r (or when the calculated third ratio p' is smaller than or equal to the calculated fourth ratio r'), the controller 150 calculates each of the longer-side length and the shorter-side length of a print region based on the longer-side length and the shorter-side length of the guideline portion and the longer-side length and the shorter-side length of the image to generate (or configure) the print region. Here, the print region may be a rectangle or a square, which includes a longer-side length and a shorter-side length of the print region.

That is, when the calculated first ratio p is greater than or equal to the calculated second ratio r (or when the calculated third ratio p' is smaller than or equal to the calculated fourth ratio r'), the controller 150 calculates (or sets) the shorter-side length of the print region to be the same length as the shorter-side length of the guideline portion and calculates (or sets) the longer-side length of the corresponding print region by multiplying a value, which is obtained by dividing the shorter-side length of the guideline portion by the shorter-side length of the image, by the longer-side length of the image, to thereby generate (or configure) the print region having a rectangular or square shape.

At this time, as in Equation 1 and Equation 2 below, the controller 150 may calculate a fifth ratio (e.g., defined as a variable m) between the shorter-side length of the guideline portion and the shorter-side length of the image, and multiply the shorter-side length and the longer-side length of the image by the calculated fifth ratio m to calculate the shorter-side length and the longer-side length of the print region.

Shorter-side length of print region=shorter-side length of guideline portion/shorter-side length of image×shorter-side length of image [Equation 1]

Longer-side length of print region=shorter-side length of guideline portion/shorter-side length of image×longer-side length of image [Equation 2]

In addition, the controller 150 generates the print region in a rectangular or square shape having the shorter-side length and the longer-side length of the print region calculated separately.

Also, the controller 150 matches a center point of the generated (or calculated) print region with a center point of the guideline portion. At this time, the controller 150 configures the generated (or calculated) print region not to deviate from the display region of the guideline portion.

In addition, the controller 150 enlarges or maintains the corresponding image so that the four vertices of the image match (or correspond to/are mapped to) four vertices of the generated print region, and display the image on the display unit 130.

That is, when the size of the image and the size of the generated print region are the same, the controller 150 displays the image on the display unit 130 while maintaining the image as it is.

In addition, when the size of the image is smaller than the size of the generated print region, the controller 150 enlarges the ratio between the shorter side and the longer side of the image (or the ratio between the width and the length)

according to the ratio between the longer side and the shorter side (or the ratio between the width and the length) of the generated print region and displays the enlarged image in the corresponding print region.

In addition, as a result of the determination (or a result of checking), when the calculated first ratio p is smaller than the calculated second ratio r (or when the calculated third ratio p' is greater than the calculated fourth ratio r'), the controller 150 separately calculates another longer-side length and another shorter-side length of another print region based on the longer-side length and the shorter-side length of the image to generate (or configure) the other print region. Here, the other print region may be a rectangle or a square having the other longer-side length and the other shorter-side length of the other print region.

That is, when the calculated first ratio p is smaller than the calculated second ratio r (or when the calculated third ratio p' is greater than the calculated fourth ratio r'), the controller 150 calculates (or sets) another longer-side length of the other print region to be the same as the longer-side length of the guideline portion, and calculates (or sets) another shorter-side length of the other print region by multiplying a value, which is obtained by dividing the longer-side length of the guideline portion by the longer-side length of the image, by the short-side length of the image, to thereby generate (configure) the other print region in a rectangular or square shape.

At this time, as in Equation 3 and Equation 4 below, the controller 150 may calculate a sixth ratio (e.g., defined as a variable n) between the longer-side length of the guideline portion and the longer-side length of the image, and multiply the shorter-side length and the longer-side length of the image by the calculated sixth ratio m to calculate the shorter-side length and the longer-side length of the other print region.

Shorter-side length of other print region=longer-side length of guideline portion/longer-side length of image×shorter-side length of image    [Equation 3]

Longer-side length of other print region=longer-side length of guideline portion/longer-side length of image×longer-side length of image    [Equation 4]

In addition, the controller 150 generates the other print region in a rectangular or square shape having a different shorter-side length and a different longer-side length of the other print region calculated above.

Also, the controller 150 matches the center point of the generated (or calculated) other print region with the center point of the guideline portion. At this time, the controller 150 configures the generated (or calculated) other print region not to deviate from the display region of the guideline portion.

In addition, the controller 150 enlarges or maintains the corresponding image so that the four vertices of the image match (or correspond to/map) the four vertices of the other print region, and displays the image on the display unit 130.

That is, when the size of the image and the size of the other generated print region are the same, the controller 150 displays the corresponding image on the display unit 130 while maintaining the image as it is.

In addition, when the size of the image is smaller than the size of the other generated print region, the controller 150 enlarges the ratio between the longer side and the shorter side (or the ratio between the width and length) of the image according to the ratio between the longer side and the shorter side (or the ratio between the width and the length) of the other generated print region, and displays the enlarged image in the corresponding other print region.

In the embodiment of the present disclosure, regarding the image located in the guideline portion, it is described that the corresponding image is maintained or enlarged to be displayed to fit the generated print region (or other print region) according to the longer-side length and the shorter-side length of the corresponding guideline portion and the longer-side length and the shorter-side length of the corresponding image, but the present disclosure is not limited thereto, and in addition to that the corresponding image is maintained or enlarged to be displayed to fit the print region (or other print region), the controller 150 may display the corresponding image to which print border setting information (e.g., with white space, without white space, etc.), print paper type (e.g., glossy, matte, etc.), automatic correction information (e.g., brightness correction, no correction, etc.) are applied in the corresponding print region (or other print region) on onside of the corresponding display unit 130.

Accordingly, the user may check a plurality of images to which the print border setting information, print paper type, automatic correction information, etc. displayed on the display unit 130 are applied and the corresponding image displayed to fit the corresponding print region (or other print region) and finally select option information desired by the corresponding user according to a checking result and store (or manage) a final state.

In the embodiment of the present disclosure, a case in which the guideline portion, the print region, and the other print region are rectangular or square is described, but the present disclosure is not limited thereto, and the guideline portion, the print region, and the other print region may be configured in the form of a circle, an ellipse, a rhombus, a polygon, etc. according to design of a designer.

In this manner, when the guideline portion, the print region, and the other print region are configured in the form of a circle, ellipse, rhombus, polygon, etc., the corresponding image may be maintained or enlarged to fit the circle, ellipse, rhombus, polygon, etc. and an outer portion of the corresponding figure may be deleted (or cut) to be processed.

Figure 2:
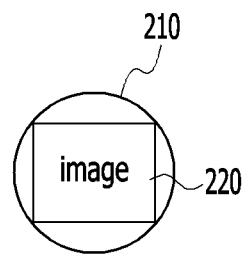
FIG. 2 is a diagram illustrating an example of a screen according to an embodiment of the present disclosure.

For example, as shown in FIG. 2, when a square image is enlarged within a circular print region, the controller 150 may display the square image 220 within the circular print region 210.

In addition, when a storage item is selected in the print region editing screen displayed on the display unit 130, the controller 150 stores the image (or the final image) that is enlarged or maintained, compared to the original image, according to the generated print region or other print region, in the storage unit 120. At this time, the controller 150 may store a print paper size for printing the corresponding final image, print border setting information (e.g., with white space, without white space, etc.), print paper type (e.g., glossy, matte, etc.), automatic correction information (e.g., brightness correction, no correction, etc.) according to a user input in an option item in the storage unit 120 together with the image (or final image) enlarged or maintained compared to the original image. Here, the storage item is activated and displayed after the print region or the other print region is generated, and may remain deactivated in a previous state (or a state in which the print region/other print region are not generated).

In addition, the controller 150 performs a payment function for the cost according to a print quantity to print a specific image (or the final image) enlarged or maintained compared to the corresponding original image by interworking with the server and a payment server (not shown).

When the payment function fails, the controller 150 receives information (e.g., limit exceeded, insufficient balance, lack of retained points, etc.) indicating that the payment function fails, transmitted from the server, and displays (or outputs) information (e.g., limit exceeded, balance insufficient, lack of retained points, etc.) indicating that the received payment function fails.

In addition, when the payment function is normally performed, the controller 150 receives a payment function execution result transmitted from the server (or the payment server).

Also, the controller 150 displays (or outputs) the received result of performing the payment function. Here, the result of performing the payment function includes a payer's name, payment date and time information, quantity, payment amount, delivery address, and the like.

In addition, after the payment function is normally performed, the controller 150 prints the final image on print paper in conjunction with the server and a printer (not shown).

That is, after the payment function is normally performed, the controller 150 transmits the final image, print paper size, print border setting information (e.g., with white space, without white space, etc.), print paper type (e.g., glossy, matte, etc.), automatic correction information (e.g., brightness correction, no correction, etc.) to the printer (or to the printer via the server) through the communication unit 110.

In addition, the printer receives the final image, print paper size, print border setting information (e.g., with white space, without white space, etc.), print paper type (e.g., glossy, matte, etc.), automatic correction information (e.g., brightness correction, no correction, etc.) transmitted from the communication unit 110, and prints the received final image on print paper according to the print paper size the print border setting information, the print paper type, and the automatic correction information.

In addition, the server performs a delivery function for the print paper printed through the printer (or the print paper to which the final image is applied) to the user related to the controller 150 (or the print region editing device 100).

Accordingly, the user of the print region editing device 100 may receive the print paper on which the final image adjusted to the size desired by the user is printed.

At this time, the user possessing the print region editing device 100 may visit an offline store equipped with the printer, print the final image on the print paper in real time through the printer, and directly receive the print paper on which the final image is printed.

As such, the controller 150 may print the final image on print paper through a printer provided in a certain store both online and offline and receive the same.

In an embodiment of the present disclosure, automatic editing (or adjustment) of the size of an image selected by the user according to the guideline portion set as a default in advance has been described, but is not limited thereto, and the controller 150 may print an image loaded by the user through the printer in a specific size according to the user's selection.

In this case, the printer may print an image of a specific size according to the user's selection using print paper of a certain size other than the default print paper size.

For example, when the user wants to print a specific image of 10 cm×15 cm, the printer may print the specific image using print paper of an arbitrary size and cut off a portion excluding a region in which the specific image is printed from the print paper of an arbitrary size to finally obtain print paper on which the specific image is printed.

In an embodiment of the present disclosure, it is described that the print region editing device 100 performs an image editing function, a print request function, etc. in the form of a dedicated application, but is not limited thereto, and in addition to the dedicated application, the image editing function, the printing request function, and the like may be performed through a website or the like provided by the server.

In this manner, when an image is released during enlargement, reduction, or movement within a preset guideline portion, a print region rectangle or print region square of longer-side length and shorter-side length may be configured according to the long-short ratio of the guideline portion and the long-short ratio of the image, and the corresponding image may be enlarged or maintained so that the four vertices of the image match the four vertices of the configured print region rectangle or print region square.

Hereinafter, a print region editing method according to the present disclosure will be described in detail with reference to FIGS. 1 to 21.

Figure 3:
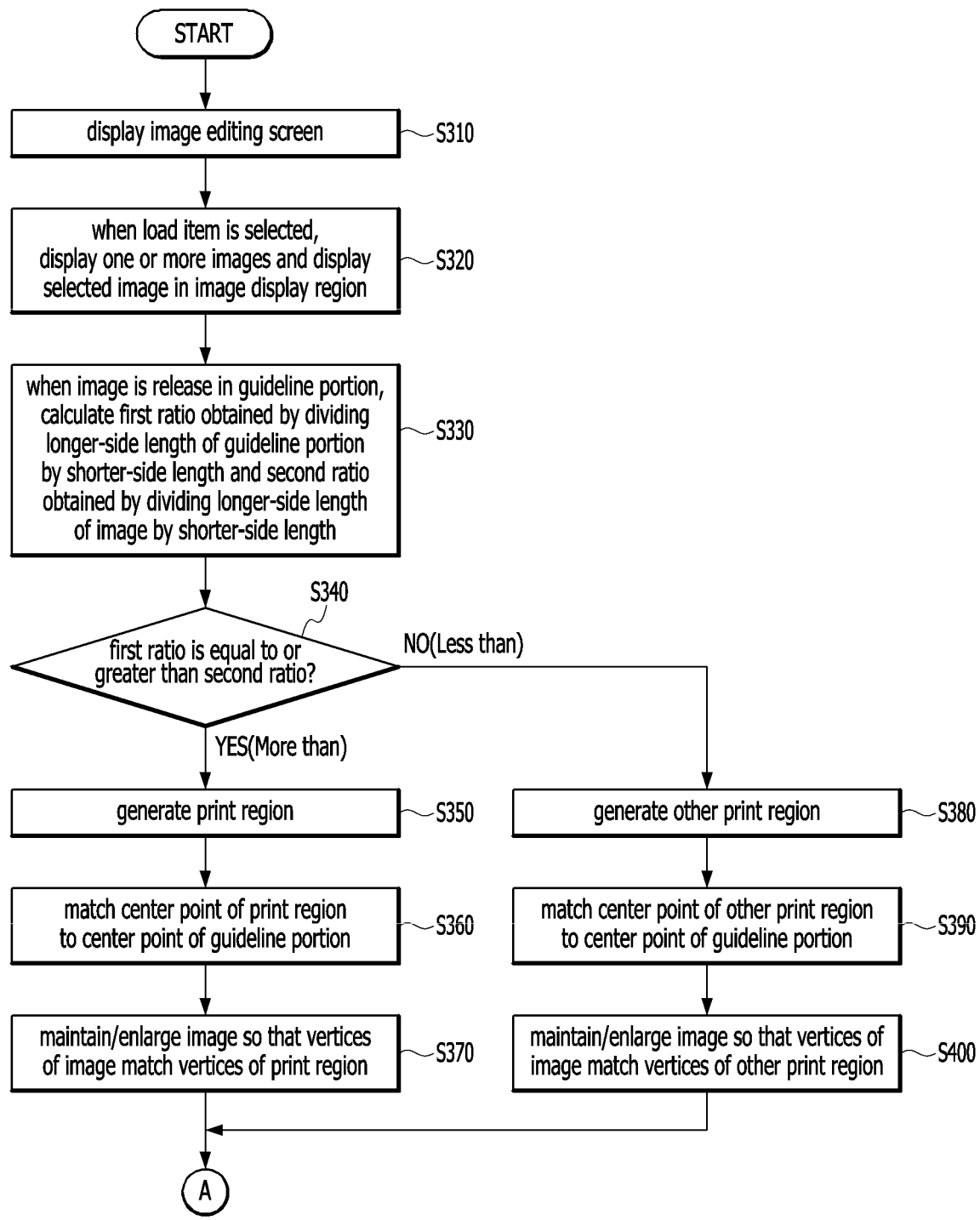
FIGS. 3 and 4 are flowcharts illustrating a print region editing method according to an embodiment of the present disclosure.
Figure 4:
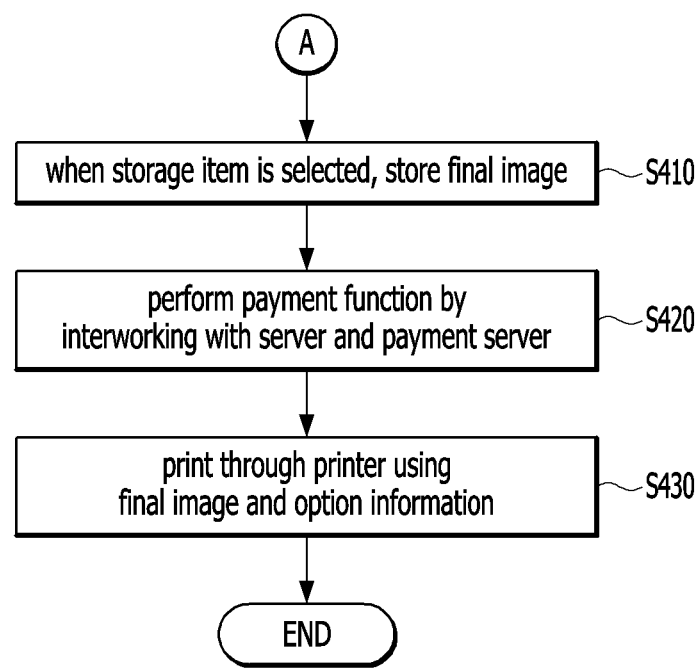

FIGS. 3 and 4 are flowcharts illustrating a print region editing method according to an embodiment of the present disclosure.

First, the controller 150 executes a dedicated application pre-installed in the corresponding print region editing device 100 and displays an application execution result screen according to the execution of the dedicated application on the display unit 130. At this time, the application execution result screen includes an image editing menu (or item/button) for scaling down or scaling up an image selected by the user by multi-touch and then adjusting a size of the reduced/enlarged image according to print paper, a print request menu for requesting a print for an edited image, a setting menu for setting dedicated application functions, and the like. Here, the controller 150 has signed up as a member to a server (not shown) providing the corresponding dedicated application and may perform a log-in procedure using the ID or the password according to the member registration and a barcode or a QR code including the ID to execute the dedicated application to perform one or more functions (e.g., image editing function, print request function, etc.) of the corresponding dedicated application.

In addition, when a preset image editing menu is selected from the application execution result screen displayed on the display unit 130, the controller 150 scales down or scales up the image selected by the user corresponding to the selected image editing menu by multi-touch, and then displays a print region editing screen for adjusting the size of the reduced/enlarged image according to print paper on the display unit 130. Here, the print region editing screen (or image editing screen) includes a load item for loading an image being stored, an option item for selecting/setting various information (e.g., a print paper size, print border setting information, a print paper type, automatic correction information, etc.) related to printing, a storage item for storing edited images according to a print region, a guideline portion display region (or guideline portion display item) for displaying a fixed guideline portion that cannot be moved or resized, a print region display item (or print region0 for displaying a print region (or other print region) generated according to enlargement/reduction/movement of an image. At this time, the print region display item maintains an inactive state, and when a print region (or other print region) is generated according to enlargement/reduction/movement of an image, the print region display item may be activated to display the generated print region (or other print region). In addition, in the guideline portion displayed in the guideline portion display region, a print paper size (e.g., 5×7 inches, resolution of 1024×768 pixels) may be set in advance according to design of a designer, and the corresponding guideline display region may be selected (or touched) or the guideline portion (or the print paper size) set as a default maybe changed through the setting menu.

Figure 5:
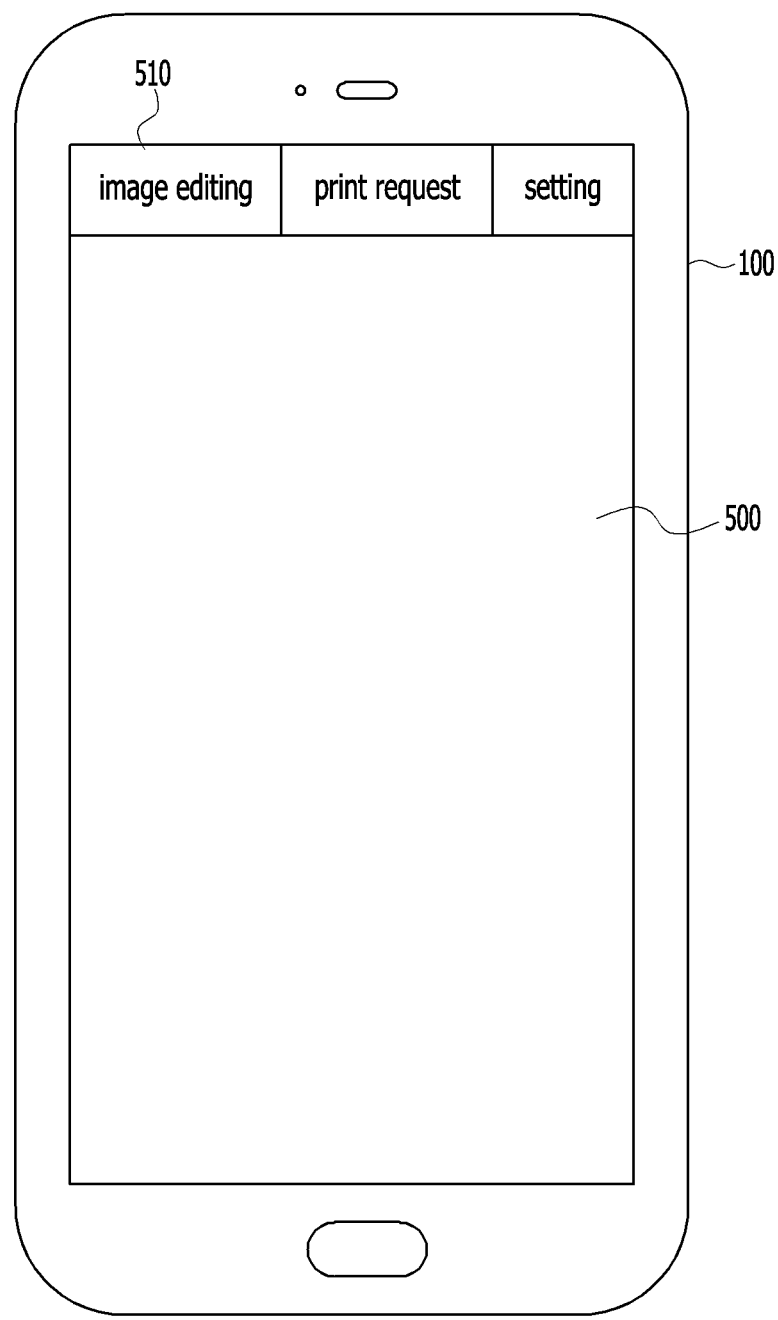
FIGS. 5 to 21 are diagrams illustrating examples of screens according to an embodiment of the present disclosure.
Figure 6:
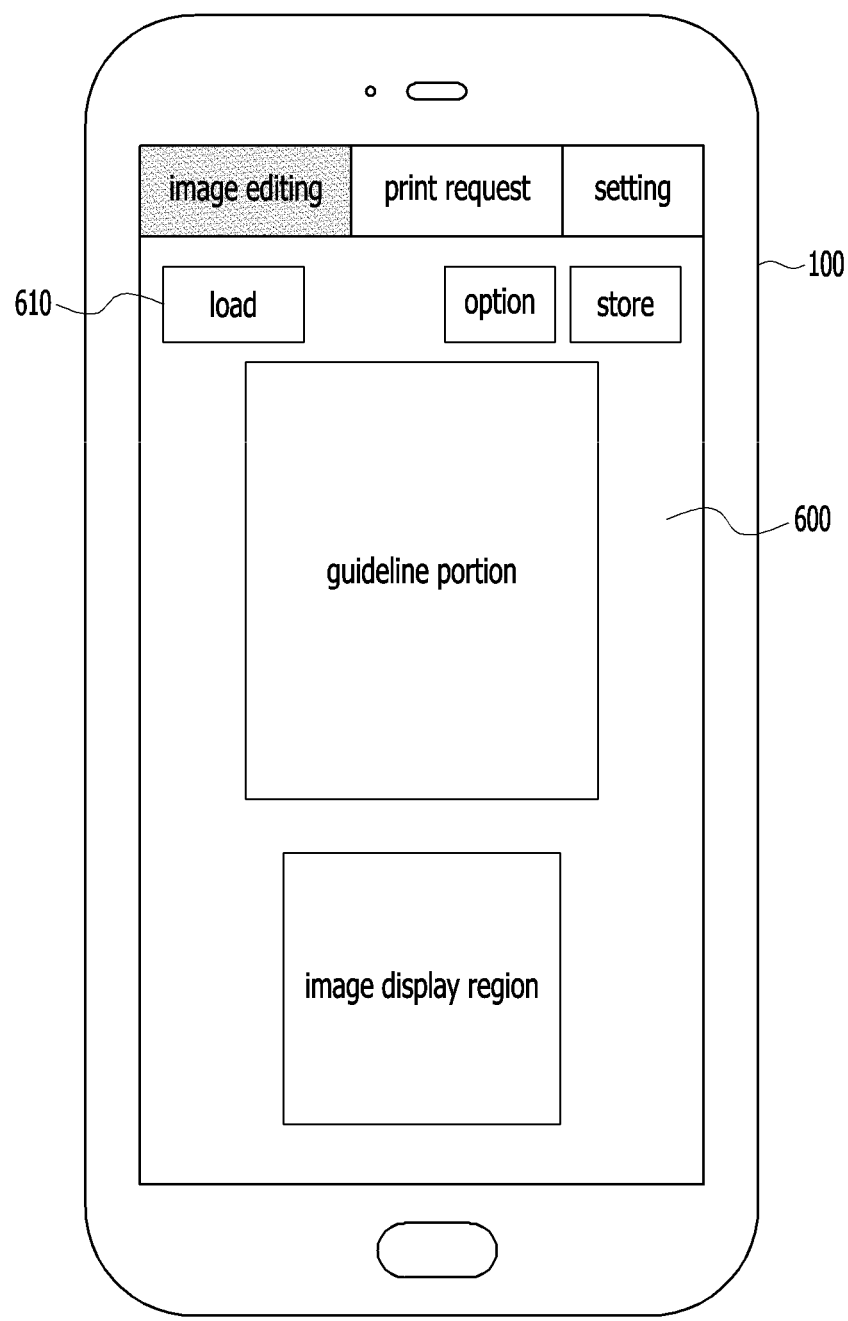

For example, the first controller 150 executes a digital photo application pre-installed in the corresponding first print region editing device 100, and displays a digital photo application execution result screen 500 on the first display unit 130 as shown in FIG. 5.

In addition, when an image editing menu 510 is selected from the digital photo application execution result screen 500 displayed on the first display unit, the first controller displays a print region editing screen 600 corresponding to the selected image editing menu 510 on the first display unit (S310).

Thereafter, when a load item is selected from the print region editing screen displayed on the display unit 130, the controller 150 displays one or more images previously stored in the storage unit 120. At this time, the controller 150 may display the one or more images on one side of the display unit 130 or may display the one or more images on the display unit 130 in a pop-up manner.

In addition, when an image is selected according to user selection (or user input/touch/control) among one or more images displayed on the display unit 130, the controller 150 displays the selected image in an image display region of the print region editing screen. At this time, when the image display region is omitted in the print region editing screen, the controller 150 may display the corresponding image in a state in which one vertex of the guideline portion display region (or the guideline portion) and the vertex of the selected image corresponding to the vertex are matched.

Figure 7:
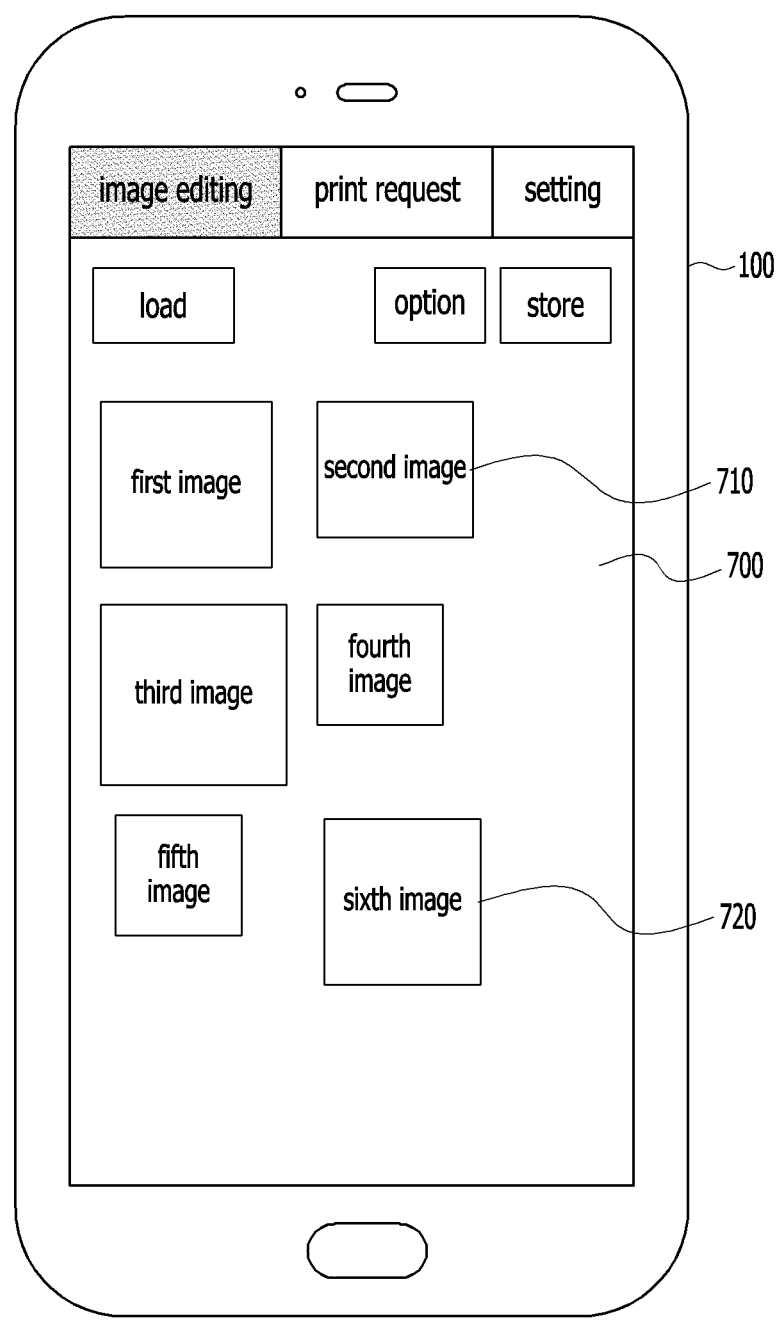

For example, when a load item 610 displayed on the print region editing screen 600 is selected, as shown in FIG. 7, the first controller displays a plurality of images 700 previously stored in the storage unit 120 on the first display unit in response to the selected load item 610.

Figure 8:
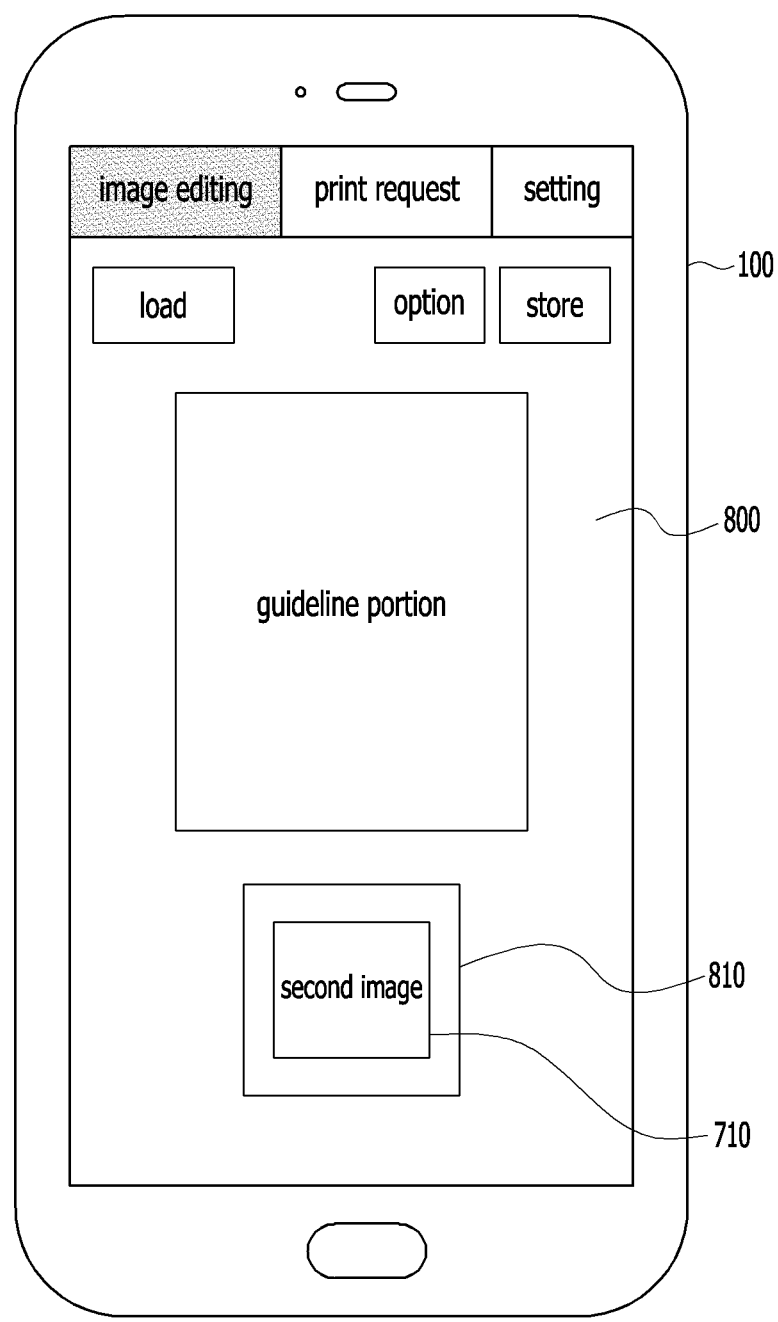

In addition, when a second image 710 is selected from among the plurality of images 700 displayed on the first display unit, as shown in FIG. 8, the first controller displays the selected second image 710 in an image display region 810 of a print region editing screen 800. Here, the second image 710 may have a resolution of 900×700 (unit: pixel).

As another example, when the load item 610 displayed on the print region editing screen 600 is selected, as shown in FIG. 7, the first controller displays the plurality of images 700 previously stored in the first storage unit on the first display unit in response to the selected load item 610.

Figure 9:
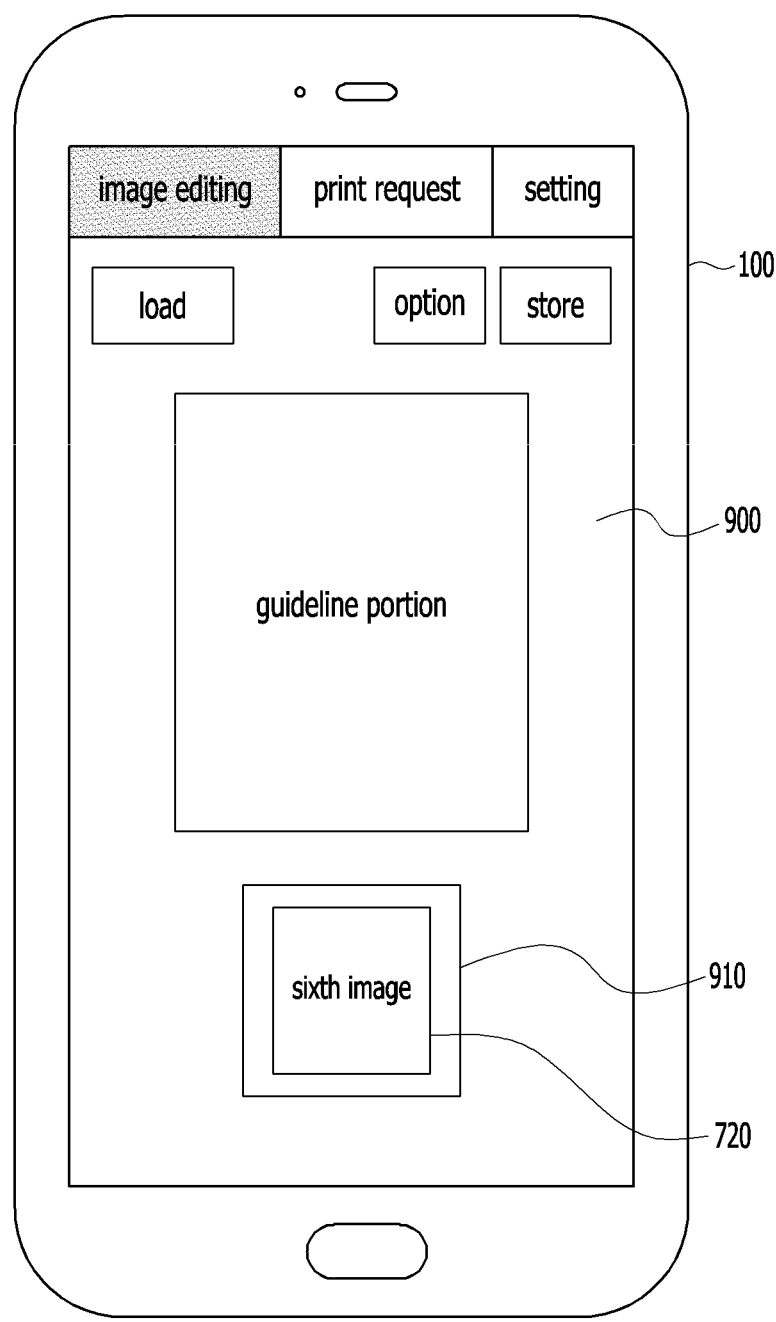

In addition, when a sixth image 720 is selected from among the plurality of images 700 displayed on the first display unit, as shown in FIG. 9, the first controller displays the selected sixth image 720 on the image display region 910 of a print region editing screen 900. Here, the sixth image 720 may have a resolution (unit: pixel) of 1000×700 (S320).

Thereafter, in a state in which an enlargement function, a reduction function, or a movement function is performed on an image displayed on the display unit 130 by a user's touch gesture or in a state in which the enlargement function, reduction function, or movement function in an editing tool (not shown) in the print region editing screen is performed on the corresponding image, when the corresponding image is released from the guideline portion (or the guideline portion display region) in the print region editing screen (or when the corresponding image is released in a state in which four vertices of the corresponding image are included in the four vertices of the guideline portion/or in a state in which the corresponding image is included in the guideline portion), the controller 150 may separately calculate a first ratio (e.g., defined as a variable p) obtained by dividing a longer-side length (or a vertical length) of the guideline portion by a shorter-side length (or a horizontal length) of the guideline portion and a second ratio (e.g., defined as a variable r) obtained by dividing a longer-side length of the image by a shorter-side length of the image. Here, the image may be in a state in which a size of the original image is maintained as it is, a state enlarged compared to the original image, a state reduced compared to the original image, and the like, according to user control. In this case, the longer-side length and the shorter-side length of the guideline portion and the image may be the number of pixels. Also, the user's touch gesture includes drag and drop, panning, pinch, and the like.

In this case, in a state in which an enlargement function, a reduction function, or a movement function is performed on an image displayed on the display unit 130 by a user's touch gesture or in a state in which the enlargement function, reduction function, or movement function in an editing tool (not shown) in the print region editing screen is performed on the corresponding image, when the corresponding image is released from the guideline portion (or the guideline portion display region) in the print region editing screen (or when the corresponding image is released in a state in which four vertices of the corresponding image are included in the four vertices of the guideline portion/or in a state in which the corresponding image is included in the guideline portion), the controller 150 may separately calculate a third first ratio (e.g., defined as a variable p') obtained by dividing the shorter-side length of the guideline portion by a longer-side length of the guideline portion and a fourth ratio (e.g., defined as a variable r') obtained by dividing the shorter-side length of the image by the longer-side length of the image.

In this manner, the controller 150 may calculate the ratio between the longer-side length and the shorter-side length of the guideline portion and the ratio between the longer-side length and the shorter-side length of the image, separately.

Figure 10:
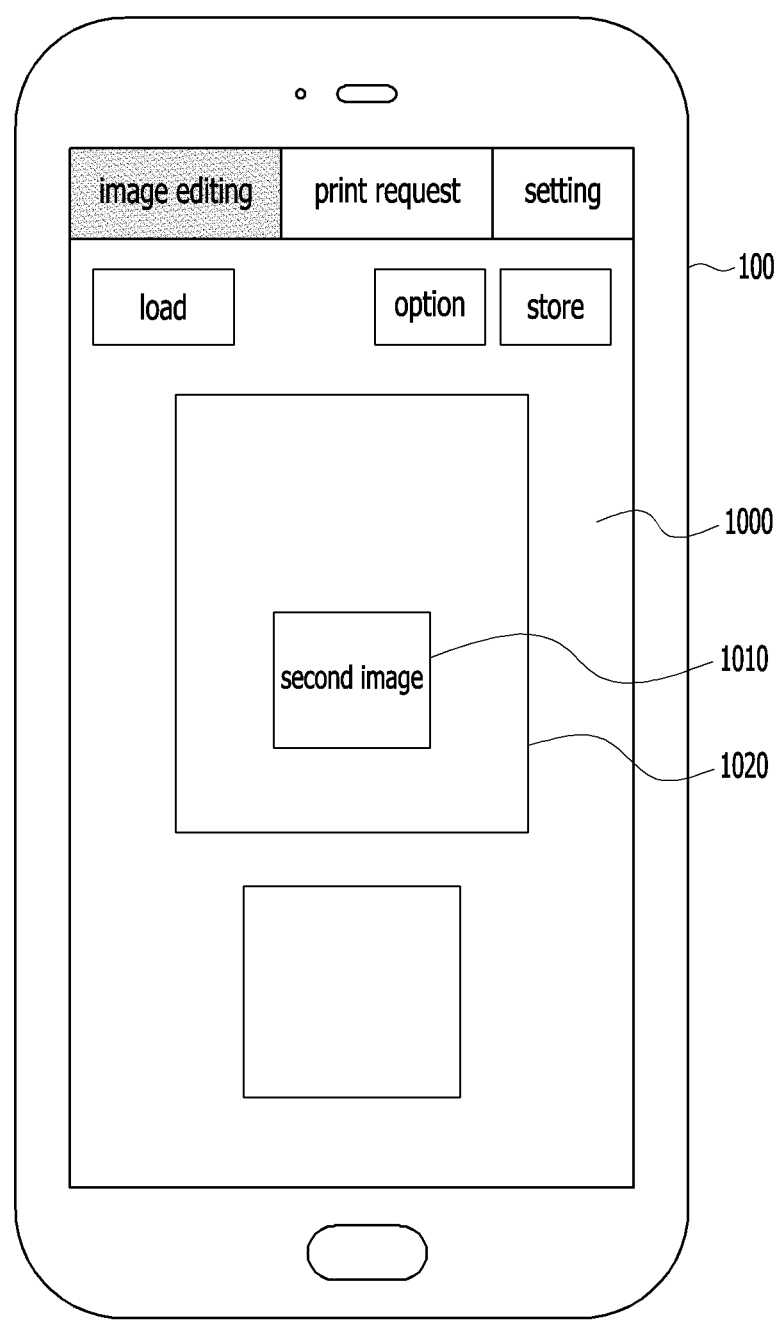

For example, as shown in FIG. 10, in a state in which a user's touch gesture (e.g., drag and drop) occurs with respect to a second image displayed on the first display unit, when the corresponding second image 1010 is released in the guideline portion 1020 of the print region editing screen 1000, the first controller calculates a p1 value (=H2/H1=1024/768=1.3333) by dividing a longer-side length H2, number of pixels 1024) of the guideline portion by the shorter-side length (H1, number of pixels 768) of the guideline portion and calculates an r1 value (=J2/J1=900/700=1.2857) by dividing the longer-side length (J2, number of pixels 900) of the second image by the shorter-side length (J1, number of pixels 700) of the second image.

Figure 11:
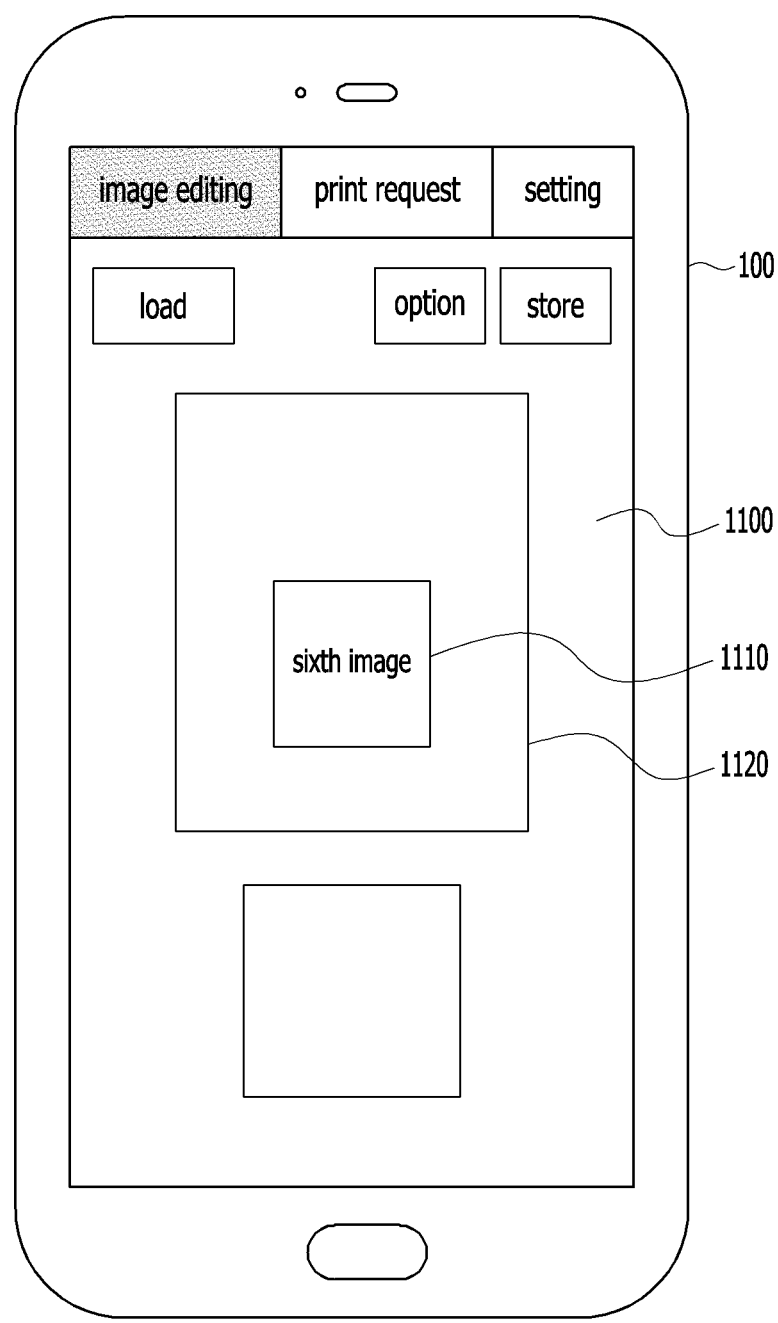

As another example, as shown in FIG. 11, in a state in which a user's touch gesture (e.g., drag and drop) occurs with respect to a sixth image displayed on the first display unit, when the corresponding sixth image 1110 is released in the guideline portion 1120 of the print region editing screen 1100, the first controller calculates a p6 value (=H2/H1=1024/768=1.3333) by dividing a longer-side length H2, number of pixels 1024) of the guideline portion by the shorter-side length (H1, number of pixels 768) of the guideline portion and calculates an r6 value (=J2/J1=1000/700=1.4285) by dividing the longer-side length (J2, number of pixels 1000) of the sixth image by the shorter-side length (J1, number of pixels 700) of the sixth image (S330).

Then, the controller 150 determines (or checks) whether the calculated first ratio p is greater than or equal to the calculated second ratio r. At this time, the controller 150 may determine whether the calculated third ratio p' is smaller than or equal to the calculated fourth ratio r'.

For example, the first controller determines whether the calculated p1 value (e.g., 1.3333) is greater than or equal to the calculated r1 value (e.g., 1.2857).

As another example, the first controller determines whether the calculated p6 value (e.g., 1.3333) is greater than or equal to the calculated r6 value (e.g., 1.4285) (S340).

As a result of the determination (or the result of the checking), when the calculated first ratio p is greater than or equal to the calculated second ratio r (or when the calculated third ratio p' is smaller than or equal to the calculated fourth ratio r'), the controller 150 separately calculates the longer-side length and the shorter-side length of the print region based on the longer-side length and the shorter-side length of the guideline portion and the longer-side length and the shorter-side length of the image to generate (configure) the print region. Here, the print region may be a rectangle or a square including a longer-side length and a shorter-side length of the print region.

That is, when the calculated first ratio p is greater than or equal to the calculated second ratio r (or when the calculated third ratio p' is smaller than or equal to the calculated fourth ratio r'), the controller 150 calculates (or sets) the shorter-side length of the print region to be the same as the shorter-side length of the guideline portion and calculates (or sets) a longer-side length of the corresponding print region by multiplying a value, which is obtained by dividing the short-side length of the guideline portion by the shorter-side length of the image, by the longer-side length of the image to generate (or configure) the print region in a rectangular or square shape.

At this time, as in Equation 1 and Equation 2 above, the controller 150 may calculate each of the shorter-side length and the longer-side length of the print region by calculating a fifth ratio (e.g., defined as variable m) between the shorter-side length of the guideline portion and the shorter-side length of the image and multiplying the shorter-side length and the longer-side length of the image by the calculated fifth ratio m.

In addition, the controller 150 generates the print region in a rectangular or square shape having the shorter-side length and the longer-side length of the print region calculated separately.

Figure 12:
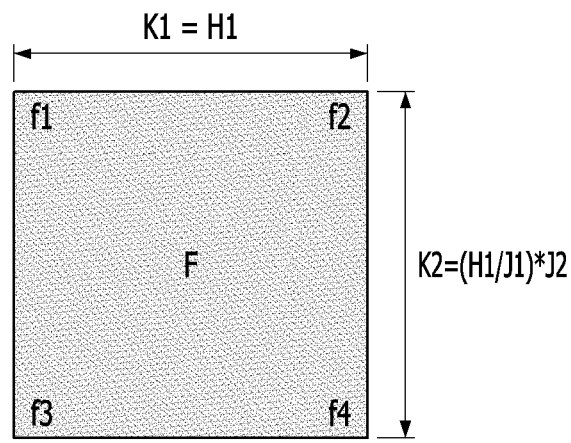

For example, as a result of the determination, when the calculated p1 value (e.g., 1.3333) is greater than the calculated r1 value (e.g., 1.2857), as shown in FIG. 12, the first controller sets the shorter-side length (H1, number of pixels 768) of the guideline portion to a shorter-side length (K1, number of pixels 768) of a first print region and set a value (H1/J1*J2=768/700*900=987) obtained by multiplying a value, which is obtained by dividing the shorter-side length (H1, the number of pixels 768) of the guideline portion by the shorter-side length (J1, the number of pixels 700) of the second image, by the longer-side length (J2, the number of pixels 900) of the second image to a longer-side length (K2, the number of pixels 987) of the first print region to generate the first print region F (1200) (S350).

Figure 13:
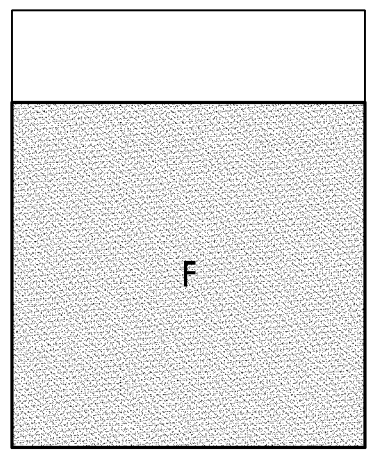
Figure 14:
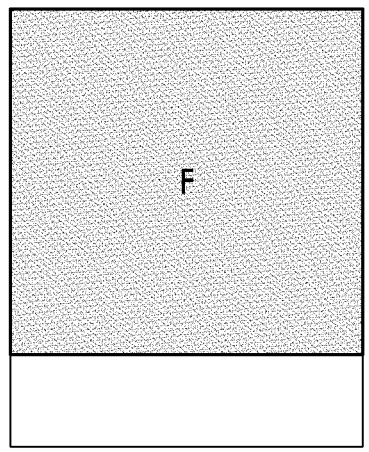

Thereafter, the controller 150 matches the center point of the generated (or calculated) print region to the center point of the guideline portion. At this time, the controller 150 configures the generated (or calculated) print region not to deviate from the display region of the guideline portion. Here, as shown in FIGS. 13 and 14, the controller 150 may match one of the shorter sides (or lower/upper side) of the generated print region to one of the shorter sides (or lower/upper side) of the guideline portion to be aligned.

Figure 15:
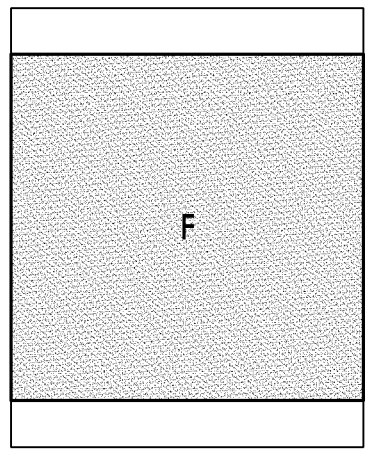

For example, as shown in FIG. 15, the first controller matches the center point of the generated first print region F to the center point of the guideline portion and displays the same on the first display unit (S360).

Thereafter, the controller 150 enlarges or maintains the corresponding image so that the four vertices of the image match (or correspond to/are mapped to) the four vertices of the generated print region, and display the corresponding image on the display unit 130.

That is, when the size of the image and the size of the generated print region are the same, the controller 150 displays the image on the display unit 130 while maintaining the corresponding image as it is.

In addition, when the size of the image is smaller than the size of the generated print region, the controller 150 enlarges the ratio between the shorter side and the longer side of the image (or the ratio between the width and the length) according to the ratio between the longer side and the shorter side (or the ratio between the width and the length) of the generated print region and displays the enlarged image in the corresponding print region.

Figure 16:
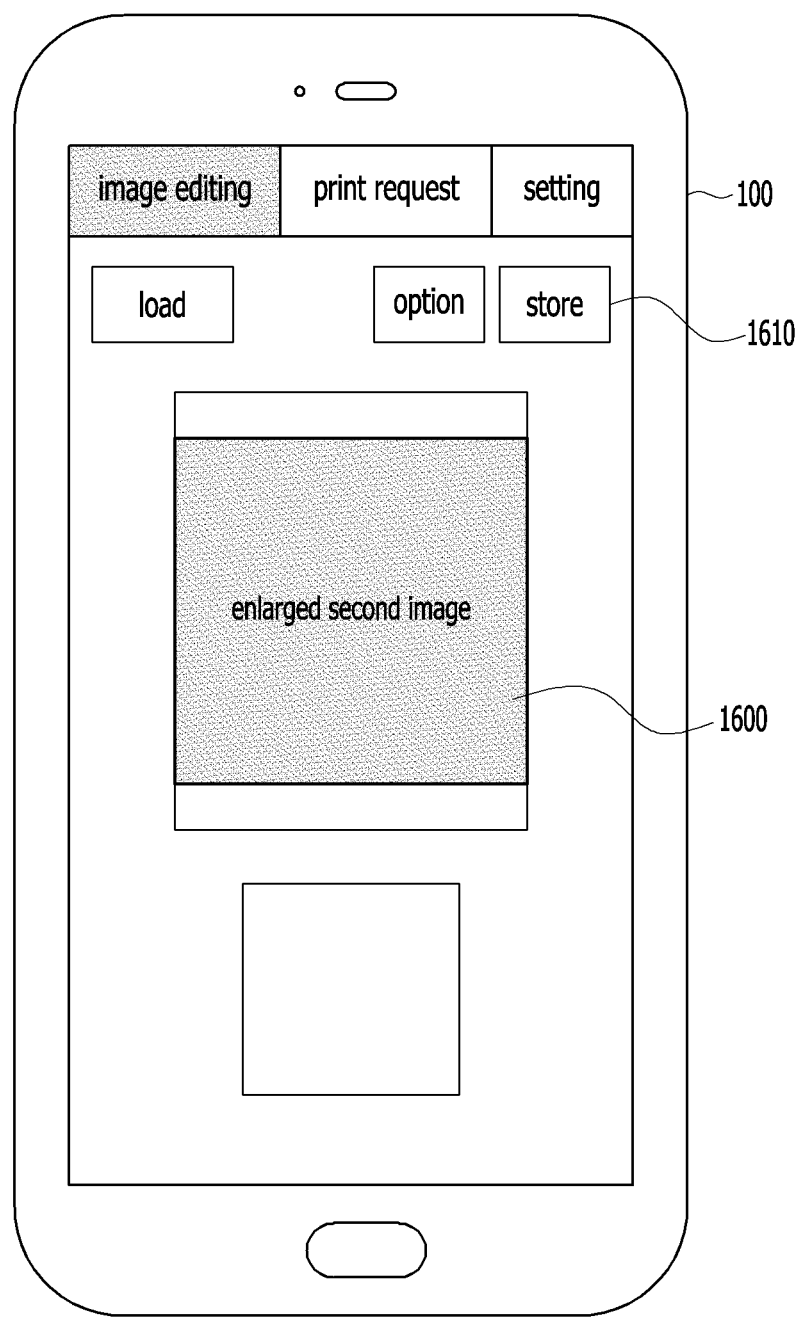

For example, the first controller enlarges four vertices of the second image to fit the generated first printing region, and displays the enlarged second image 1600 on the display unit as shown in FIG. 16 (S370).

In addition, as a result of the determination (or a result of checking), when the calculated first ratio p is smaller than the calculated second ratio r (or when the calculated third ratio p' is greater than the calculated fourth ratio r'), the controller 150 separately calculates another longer-side length and another shorter-side length of another print region based on the longer-side length and the shorter-side length of the image to generate (or configure) the other print region. Here, the other print region may be a rectangle or a square having the other longer-side length and the other shorter-side length of the other print region.

That is, when the calculated first ratio p is smaller than the calculated second ratio r (or when the calculated third ratio p' is greater than the calculated fourth ratio r'), the controller 150 calculates (or sets) another longer-side length of the other print region to be the same as the longer-side length of the guideline portion, and calculates (or sets) another shorter-side length of the other print region by multiplying a value, which is obtained by dividing the longer-side length of the guideline portion by the longer-side length of the image, by the short-side length of the image, to thereby generate (configure) the other print region in a rectangular or square shape.

At this time, as in Equation 3 and Equation 4 above, the controller 150 may calculate a sixth ratio (e.g., defined as a variable n) between the longer-side length of the guideline portion and the longer-side length of the image, and multiply the shorter-side length and the longer-side length of the image by the calculated sixth ratio m to calculate the shorter-side length and the longer-side length of the other print region.

In addition, the controller 150 generates the other print region in a rectangular or square shape having a different shorter-side length and a different longer-side length of the other print region calculated above.

Figure 17:
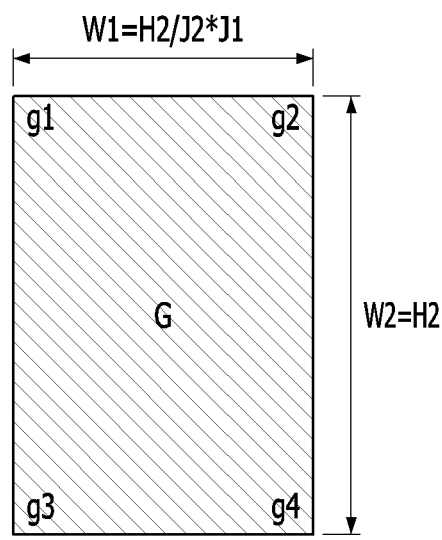

For example, as a result of the determination, when the calculated p6 value (e.g., 1.3333) is greater than the calculated r6 value (e.g., 1.4285), as shown in FIG. 17, the first controller sets the longer-side length (H2, number of pixels 1024) of the guideline portion to a longer-side length (W2, number of pixels 1024) of a second print region and set a value (H2/J2*J1=1024/1000*700=716) obtained by multiplying a value, which is obtained by dividing the longer-side length (H2, the number of pixels 1024) of the guideline portion by the longer-side length (J2, the number of pixels 1000) of the second image, by the shorter-side length (J1, the number of pixels 700) of the second image to a shorter-side length (W1, the number of pixels 716) of the second print region to generate the second print region G (1700) (S380).

Figure 18:
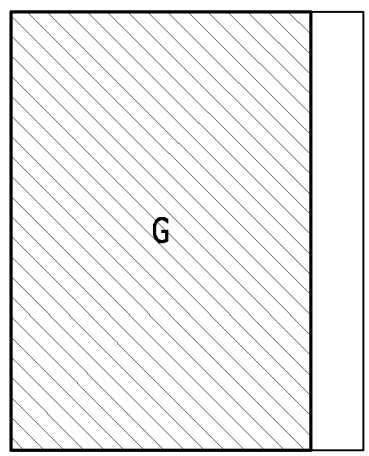
Figure 19:
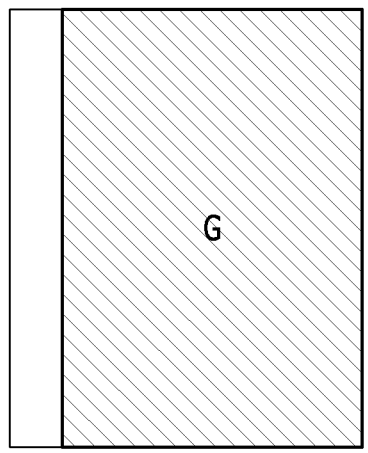

Thereafter, the controller 150 matches the center point of the other generated (or calculated) print region to the center point of the guideline portion. At this time, the controller 150 configures the other generated (or calculated) print region not to deviate from the display region of the guideline portion. Here, as shown in FIGS. 18 and 19, the controller 150 may match one of the longer sides (or left/right side) of the other generated print region to one of the longer sides (or left/right side) of the guideline portion to be aligned.

Figure 20:
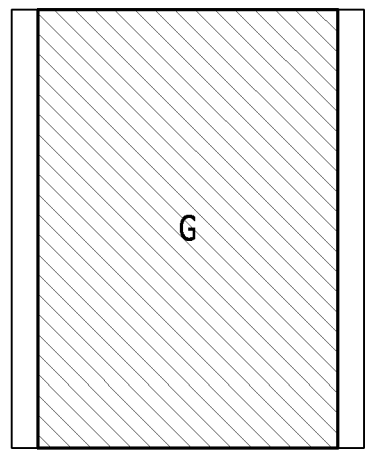

For example, as shown in FIG. 20, the first controller matches the center point of the generated second print region G to the center point of the guideline portion and displays the same on the first display unit (S390).

Thereafter, the controller 150 enlarges or maintains the corresponding image so that the four vertices of the image match (or correspond to/are mapped to) the four vertices of the other generated print region, and display the corresponding image on the display unit 130.

That is, when the size of the image and the size of the other generated print region are the same, the controller 150 displays the image on the display unit 130 while maintaining the corresponding image as it is.

In addition, when the size of the image is smaller than the size of the other generated print region, the controller 150 enlarges the ratio between the shorter side and the longer side of the image (or the ratio between the width and the length) according to the ratio between the longer side and the shorter side (or the ratio between the width and the length) of the other generated print region and displays the enlarged image in the other corresponding print region.

Figure 21:
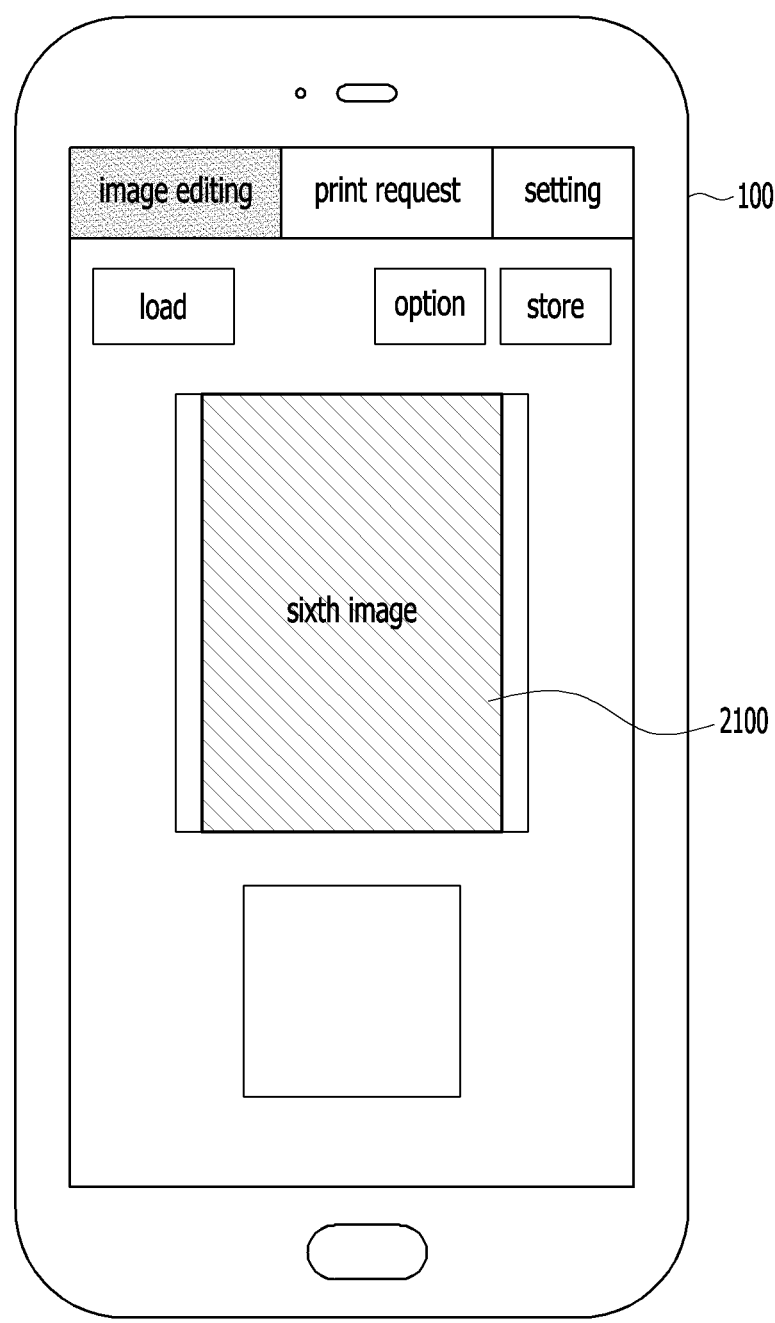

For example, the first controller enlarges four vertices of the sixth image to fit the generated second printing region, and displays the enlarged sixth image 2100 on the display unit as shown in FIG. 21 (S400).

Thereafter, when a storage item is selected in the print region editing screen displayed on the display unit 130, the controller 150 stores the image (or the final image) enlarged or maintained, compared to the original image, according to the generated print region or other print region, in the storage unit 120. At this time, the controller 150 may store a print paper size for printing the corresponding final image, print border setting information (e.g., with white space, without white space, etc.), print paper type (e.g., glossy, matte, etc.), automatic correction information (e.g., brightness correction, no correction, etc.) according to a user input in an option item in the storage unit 120 together with the image (or final image) enlarged or maintained compared to the original image. Here, the storage item is activated and displayed after the print region or the other print region is generated, and may remain deactivated in a previous state (or a state in which the print region/other print region are not generated).

For example, when a storage item 1610 is selected in the print region editing screen displayed on the first display unit, the first controller stores the enlarged second final image, a second print paper size (e.g., a size corresponding to the first print region), second print border setting information (e.g., without a white space), second print paper time (e.g., matte), second automatic correction information (e.g., brightness correction), etc. according to a user input in the first storage unit (S410).

Thereafter, In addition, the controller 150 performs a payment function for the cost according to a print quantity to print a specific image (or the final image) enlarged or maintained compared to the corresponding original image by interworking with the server and a payment server (not shown).

In addition, when the payment function is normally performed, the controller 150 receives a payment function execution result transmitted from the server (or the payment server) and displays (or outputs) the received result of performing the payment function. Here, the result of performing the payment function includes a payer's name, payment date and time information, quantity, payment amount, delivery address, and the like.

For example, the first controller performs the payment function for a first cost (e.g., 10 prints, 13,000 won, including a delivery charge) for printing the enlarged second final image by interworking with the server and the payment server (S420).

Thereafter, after the payment function is normally performed, the controller 150 prints the final image on print paper in conjunction with the server and a printer (not shown).

That is, after the payment function is normally performed, the controller 150 transmits the final image, print paper size, print border setting information (e.g., with white space, without white space, etc.), print paper type (e.g., glossy, matte, etc.), automatic correction information (e.g., brightness correction, no correction, etc.) to the printer (or to the printer via the server) through the communication unit 110.

In addition, the printer receives the final image, print paper size, print border setting information (e.g., with white space, without white space, etc.), print paper type (e.g., glossy, matte, etc.), automatic correction information (e.g., brightness correction, no correction, etc.) transmitted from the communication unit 110, and prints the received final image on print paper according to the print paper size the print border setting information, the print paper type, and the automatic correction information.

In addition, the server performs a delivery function for the print paper printed through the printer (or the print paper to which the final image is applied) to the user related to the controller 150 (or the print region editing device 100).

Accordingly, the user of the print region editing device 100 may receive the print paper on which the final image adjusted to the size desired by the user is printed.

For example, when the first cost for printing 10 second final images is normally paid, the first controller prints the second final image on print paper through the printer interworking with the corresponding first print region editing device (S430).

As described above, in this manner, when an image is released during enlargement, reduction, or movement within a preset guideline portion, a print region rectangle or print region square of longer-side length and shorter-side length may be configured according to the long-short ratio of the guideline portion and the long-short ratio of the image, and the corresponding image may be enlarged or maintained so that the four vertices of the image match the four vertices of the configured print region rectangle or print region square, and accordingly, the paper-full format and the image-full format may be freely changed according to the enlargement and reduction of the image.

The foregoing may be modified and modified by those skilled in the art without departing from the essential characteristics of the present disclosure. Therefore, the embodiments disclosed in the present disclosure are not intended to limit but to explain the technical idea of the present disclosure, and the scope of the technical idea of the present disclosure is not limited by these embodiments. The scope of the present disclosure should be construed according to the claims below, and all technical ideas within the equivalent range should be construed as being included in the scope of the present disclosure.

MODE FOR INVENTION

Modes for carrying out the invention have been described together in the best mode for carrying out the invention above.

INDUSTRIAL APPLICABILITY

In the present disclosure, when an image is released during enlargement, reduction, or movement within a preset guideline portion, configuring a print region rectangle or print region square of a longer-side length and a shorter-side length according to a long-short ratio of the guide line portion and a long-short ratio of the corresponding image and enlarging or maintaining the corresponding image so that four vertices of the corresponding image match four vertices of the configured print region rectangle or print region square, thereby freely changing a paper-full format and an image-full format according to the enlargement or reduction of the image, thus having industrial applicability.

The invention claimed is:

1. A print region editing device comprising:
a display configured to display a print region editing screen including an image; and
a controller configured to, when the image is released in a guideline portion of the print region editing screen in a state in which any one function among enlargement, reduction, and movement is performed by a user's touch gesture on the image, calculate each of a first ratio obtained by dividing a longer-side length of the guideline portion by a shorter-side length of the guideline portion and a second ratio obtained by dividing a longer-side length of the image by a shorter-side length of the image, determine whether the calculated first ratio is greater than or equal to the calculated second ratio, calculate, when the calculated first ratio is greater than or equal to the calculated second ratio as a result of the determination, each of a longer-side length and a shorter-side length of a print region based on the longer-side length and the shorter-side length of the guideline portion and the longer-side length and shorter-side length of the image to generate the print region, match a center point of the generated print region to a center point of the guideline portion, enlarge or maintain the image so that four vertices of the image match four vertices of the generated print region, and display a resultant image on the display,
wherein the controller is configured to calculate a fifth ratio between the shorter-side length of the guideline portion and the shorter-side length of the image, calculate the shorter-side length of the print region by multiplying the shorter-side length of the image by the calculated fifth ratio, calculate the longer-side length of the print region by multiplying the longer-side length of the image by the calculated fifth ratio, and generate the print region having a rectangular or square shape including the calculated shorter-side length of the print region and the calculated longer-side length of the print region, wherein when a size of the image and a size of the generated print region are the same, the controller displays the image on the display while maintaining the image as it is,
wherein when the calculated first ratio is smaller than the calculated second ratio as a result of the determination, the controller is configured to calculate each of a different longer-side length and a different shorter-side length of a different print region based on the longer-side length and the shorter-side length of the guideline portion and the longer-side length and the shorter-side length of the image to generate the different print region, match a center point of the generated different print region to a center point of the guideline portion, and enlarge or maintain the image so that four vertices of the image match four vertices of the generated different print region, and display a resultant image on the display,
wherein the print region editing screen includes a load item for loading an image being stored, an option item for selecting or setting a print paper size, print border setting information, a print paper type and an automatic correction information related to printing, a storage item for storing edited images according to the print region, a guideline portion display region for displaying a fixed guideline portion that cannot be moved or resized, a print region display item for displaying the print region generated according to enlargement or reduction or movement of the image and the print region display item maintains an inactive state, and when the print region is generated according to enlargement or reduction or movement of the image, the print region display item is activated to display the generated print region, and
wherein the controller displays the corresponding image in a state in which one vertex of the guideline portion display region and the vertex of the selected image corresponding to the vertex are matched when the image display region is omitted in the print region editing screen, and when the storage item is selected in the print region editing screen displayed on the display, the controller stores the image enlarged or maintained, compared to the original image, according to the generated print region or other print region, in the storage item together with print paper size for printing the corresponding final image, print border setting information including white space or without white space, print paper type and automatic correction information, and after payment function is normally performed, the controller prints the final image on print paper in conjunction with a server.

2. A print region editing method comprising:
when an image displayed on a display is released in a guideline portion of the print region editing screen in a state in which any one function among enlargement, reduction, and movement is performed by a user's touch gesture on the image,
calculating, by a controller, each of a third ratio obtained by dividing a shorter-side length of the guideline portion by a longer-side length of the guideline portion and a fourth ratio obtained by dividing a shorter-side length of the image by a longer-side length of the image;

determining, by the controller, whether the calculated third ratio is smaller than or equal to the calculated fourth ratio;

calculating, by the controller, when the calculated third ratio is smaller than or equal to the calculated fourth ratio as a result of the determination, each of a longer-side length and a shorter-side length of a print region based on the longer-side length and the shorter-side length of the guideline portion and the longer-side length and shorter-side length of the image to generate the print region;

matching, by the controller, a center point of the generated print region to a center point of the guideline portion; and enlarging or maintaining, by the controller, the image so that four vertices of the image match four vertices of the generated print region and displaying a resultant image on the display, wherein generating the print region comprises:
  calculating a fifth ratio between the shorter-side length of the guideline portion and the shorter-side length of the image;
  calculating the shorter-side length of the print region by multiplying the shorter- side length of the image by the calculated fifth ratio;
  calculating the longer-side length of the print region by multiplying the longer- side length of the image by the calculated fifth ratio; and
  generating the print region having a rectangular or square shape including the calculated shorter-side length of the print region and the calculated longer-side length of the print region, wherein enlarging or maintaining the image so that the four vertices of the image match the four vertices of the generated print region and displaying the resultant image on the display comprises one of:
  displaying the image on the display, while maintaining the image as it is, when a size of the image and a size of the generated print region are the same; and
  enlarging a ratio between a longer side and a shorter side of the image to fit a ratio between a longer side and a shorter side of the generated print region and displaying the enlarged image in the print region, when the size of the image is smaller than the size of the generated print region, wherein when the calculated third ratio is greater than the calculated fourth ratio as a result of the determination, the method comprises:
  calculating, by the controller, each of a different longer-side length and a different shorter-side length of a different print region based on the longer-side length and the shorter-side length of the guideline portion and the longer-side length and the shorter-side length of the image to generate the different print region;
  matching, by the controller, a center point of the generated different print region to a center point of the guideline portion; and
  enlarging or maintaining, by the controller, the image so that four vertices of the image match four vertices of the generated different print region and displaying the resultant image on the display, wherein generating of the different print region comprises:
  calculating a sixth ratio between the longer-side length of the guideline portion and the longer-side length of the image;
  calculating the different shorter-side length of the different print region by multiplying the shorter-side length of the image by the calculated sixth ratio;
  calculating the different longer-side length of the different print region by multiplying the longer-side length of the image by the calculated sixth ratio; and
  generating the different print region having a rectangular or square shape including the calculated different shorter-side length of the different print region and the calculated different longer-side length of the different print region, wherein enlarging or maintaining of the image so that the four vertices of the image match the four vertices of the generated different print region and displaying the resultant image on the display comprises any one of:
  displaying the image on the display, while maintaining the image as it is, when a size of the image and a size of the generated different print region are the same; and
  enlarging a ratio between a longer side and a shorter side of the image to fit a ratio between a longer side and a shorter side of the generated different print region and displaying the enlarged image in the different print region, when the size of the image is smaller than the size of the generated different print region, wherein when a storage item is selected in the print region editing screen displayed on the display, the method comprises:
  storing, by the controller, a final image which is an image enlarged or maintained compared to an original image according to the generated print region or a different print region together with a size of print paper on which the corresponding final image according to a user input in an option item is to be printed, print border setting information, a print paper type, and the automatic correction information;
  performing, by the controller, a payment function for a cost according to a quantity to be printed in order to print the final image on print paper, by interworking with a server and a payment server; and
  printing, by the controller, the final image on print paper by interworking with the server and the printer, after the payment function is normally performed, and wherein print region editing screen includes a load item for loading an image being stored, an option item for selecting or setting a print paper size, print border setting information, a print paper type and an automatic correction information related to printing, the storage item for storing edited images according to the print region, a guideline portion display region for displaying a fixed guideline portion that cannot be moved or resized, a print region display item for displaying the print region generated according to enlargement or reduction or movement of the image and the print region display item maintains an inactive state, and when the print region is generated according to enlargement or reduction or movement of the image, the print region display item is activated to display the generated print region.

* * * * *